US004001617B2

United States Statutory Invention Registration [19]

[11] Reg. Number: H1617

Fuller, Jr.

[45] Published: Dec. 3, 1996

[54] QUAD-VIDEO SENSOR AND METHOD

[75] Inventor: James M. Fuller, Jr., Ridgecrest, Calif.

[73] Assignee: The United States of America as represented by the Secretary of the Navy, Washington, D.C.

[21] Appl. No.: 332,273

[22] Filed: Oct. 31, 1994

Related U.S. Application Data

[63] Continuation of Ser. No. 573,967, Aug. 27, 1990, abandoned.

[51] Int. Cl.[6] ..... H04N 5/225

[52] U.S. Cl. ..... 348/558; 348/171; 348/218; 244/3.16

[58] Field of Search ..... 358/406; 348/218, 348/558, 171

[56] References Cited

U.S. PATENT DOCUMENTS

| | | | |
|---|---|---|---|
| 3,988,534 | 10/1976 | Sacks | 348/171 |
| 4,775,799 | 10/1988 | Milch | 358/482 |
| 5,047,858 | 9/1991 | Aimonoya | 348/218 |

FOREIGN PATENT DOCUMENTS 5945787 3/1984 Japan .

*Primary Examiner*—Bernarr E. Gregory
*Attorney, Agent, or Firm*—Melvin J. Sliwka

[57] ABSTRACT

A video signal processor has parallel signal processing circuits to reduce processing time. A plurality of pixel imaging arrays produce signals indicative of an object. The pixel imaging arrays are scanned simultaneously and processed by parallel circuits to produce a plurality of video signals. The video image signals are combined to produce a signal suitable for display on a conventional video monitor.

8 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

QUAD-VIDEO SENSOR AND METHOD

This is a continuation of parent application: Ser. No. 07/573,967 filed on Aug. 27, 1990, now abandoned.

BACKGROUND OF THE INVENTION

This invention relates generally to processing signals from imaging systems. More particularly, this invention relates to processing signals output from infrared sensors. Still more particularly, this invention relates to apparatus and methods for processing infrared sensor signals to guide a missile or the like toward a target.

The signal outputs from imaging infrared sensors are serial in nature. One of the problems encountered in using such sensors is the amount of time required to process the data output. The processing time is a critical factor in a high speed missile system flying toward a target.

U.S. Pat. No. 4,692,944, issued Sep. 8, 1987 to Masuzaki et al. discloses an image data processing system that includes an optical disk storage memory, a bit serial image data processing unit and an address calculation unit. The optical disk storage memory stores image data, and the bit serial processing unit processes the image data stored in the memory. The address calculation unit operates in parallel with the image data processing unit for calculating the address of the image data stored in the memory and for controlling the input and output of image data to and from the image data processing unit.

U.S. Pat. No. 4,694,398, issued Sep. 15, 1987 to Croteau discloses a digital image frame processor for processing two dimensional images produced digitally by an array of radiographic or ultrasonic detectors. Croteau's frame processor is designed to receive and correct sequential frames of digital images produced by a camera. The frame processor uses a forty-eight bit wide control word to enable several functions to be performed in parallel and incorporates bit-slice computer technology in an arithmetic logic unit.

U.S. Pat. No. 4,713,789, issued Dec. 15, 1987 to Suzuki discloses an image processor for processing X-ray transmission image data. Suzuki's image processor has a memory section that includes a plurality of storage means. The processor includes a control section that has means for generating address signals and applying the address signals to the corresponding storage means. Suzuki further discloses a processing circuit and a central control circuit that allow processing operations and storage in the memory means to be performed in parallel.

U.S. Pat. No. 4,727,423, issued Feb. 23, 1988 to Kaneko et al. discloses a video data processing circuit that includes a plurality of parallel-to- serial convertors and look-up tables. Kaneko et al. discloses reading video data in parallel from a plurality of video RAMS and providing the data to a corresponding parallel-to- serial convertor. The parallel-to-serial convertors store the video data in parallel. Each of the parallel-to- serial convertors serially outputs the stored video data to corresponding look-up tables. Each of the look-up tables converts the supplied video data into color data to be supplied to a selector, which outputs the caller data.

U.S. Pat. No. 4,745,469, issued May 17, 1988 to Waldecker et al. is directed to an optical apparatus for aligning vehicle wheels. Video cameras read the contour lines of a rotating wheel. Control of the video cameras and processing of the video data output from the video cameras is performed by a parallel processor-based computer system coordinated by sequential circuits.

SUMMARY OF THE INVENTION

The present invention provides video signal processor having a parallel signal processing capability. The video signal processor has substantially reduced processing time in comparison to conventional video signal processors. The video signal processor according to the present invention may be used to process larger, more sophisticated image processing algorithms than is possible with conventional video.

A video sensor system according to the present invention for processing optical image signals comprises a plurality of pixel imaging arrays for producing signals indicative of an object. A video image processor is connected to each pixel imaging array. The video image processors operate in parallel for processing the signals produced by the plurality of pixel arrays to produce a plurality of video image signals. The video sensor system further includes means for combining the plurality of video image signals to produce a video signal indicative of the object.

The video sensor system preferably includes a plurality of circuits connected in parallel between the pixel imaging arrays and the means for combining the plurality of video image signals. Each circuit of the parallel circuits may comprise means for scanning a corresponding one of the pixel arrays to produce analog signals indicative of optical signals incident upon the pixel array and means for converting the analog signals to digital video and target data signals. The video sensor system preferably includes four pixel imaging arrays and four parallel processing circuits.

The means for combining the plurality of video image signals may comprise a video random access memory having a plurality of sections, each section being connected to a corresponding one of the video image processor means to receive digital video signals therefrom. A video random access scanning means may be connected to the video random access memory, and a digital to analog converter may be connected to the video random access means for producing a video signal output.

DESCRIPTION OF THE PREFERRED EMBODIMENT

Figure 1:
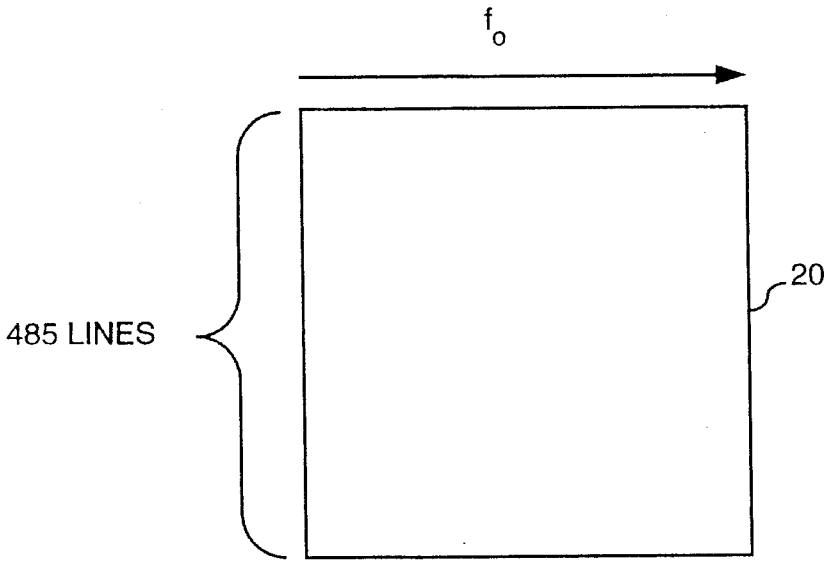
FIG. 1 is a front view of a typical prior art imaging sensor array.

Referring to FIG. 1, a typical imaging array includes a video sensor 20 that outputs 525 video lines, 485 of which are displayed on a video monitor. Each line is scanned from left to right with a frequency $f_o$, which is the video scan rate. In a conventional video sensing system, the sensor is scanned completely from left to right and top to bottom thirty times per second, which means that all 525 lines are scanned at a rate of 30 Hz.

A typical imaging array system includes scanning electronics (not shown) that converts the images on the pixel array into electrical signals. A preamplifier (not shown) amplifies the electrical output signals from the scanning electronics to produce a video signal. The video signal may be digitized for further processing. The digital video signal is then typically sent to a video signal processor one pixel at a time. A serial video signal processing system must accumulate the serial data before any parallel processing can be done on it.

Figure 2:
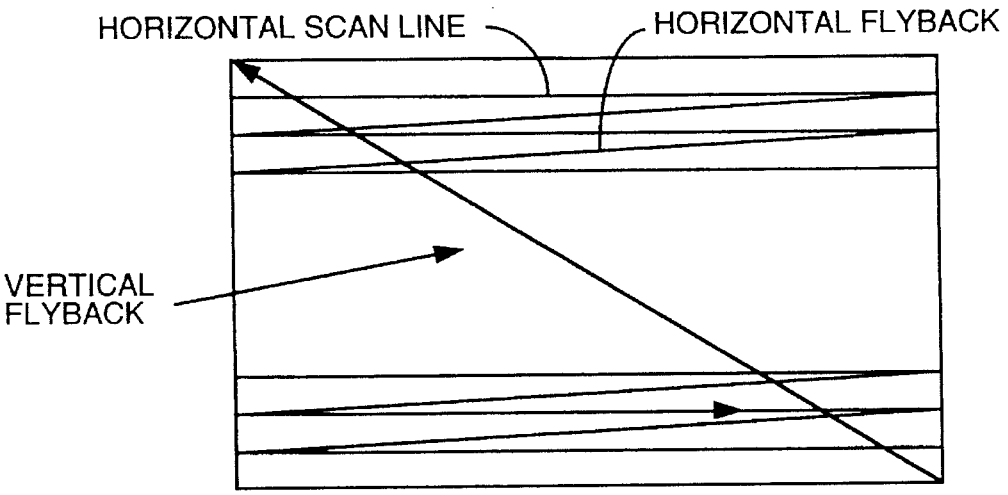
FIG. 2 illustrates scanning of the array of FIG. 1 to read out pixel values.

FIG. 2 illustrates the manner in which the sensor 20 is scanned to read out the pixel, or picture element, values. The left to right scan is called the horizontal scan. After the right-most pixel is read, or scanned out of the sensor 20, the reading or scanning of pixels begins at the start, or left-most pixel of the next line. The time between reading the right-most pixel of a line and the left-most pixel of the next line is called the horizontal blanking time. The horizontal blanking time is also called the horizontal flyback, which is a term used to describe when an electron beam repositions itself quickly at the start of the next line.

Likewise, after the last pixel, the right-most pixel of the bottom line, is read, then scanning begins again at the left-most pixel of the top line. The time between reading these two pixels is called the vertical blanking time. The vertical blanking time is also called the vertical flyback. FIG. 2 shows the horizontal scan lines and the horizontal and vertical blanking.

The time to complete one scan line, that is the time to sweep one line from left to right for conventional video is $$\text{scan line time} = \frac{1}{\left(\frac{525\text{ lines}}{\text{frame time}}\right)} = \frac{1}{\left(\frac{525\text{ lines}}{\left(\frac{1}{30\frac{\text{frames}}{s}}\right)}\right)} = \frac{1}{\left(\frac{525\text{ lines}}{33.33\text{ ms}}\right)} = 63.5\ \mu s$$

The above calculation gives the total time to scan one line plus the time to perform one horizontal flyback. The horizontal blanking is about 10.9 μs for each line, which leaves about 52.6 μs for transmission of video data. The vertical blanking lasts for 20 horizontal scan lines or 1.27 μs. The time to read each pixel is $$\text{Time per pixel} = \frac{1\text{ line}}{512\text{ pixels}} \times \frac{52.6\ \mu s}{\text{line}} = 102.7\ \frac{\text{ns}}{\text{pixel}}$$

Figure 3:
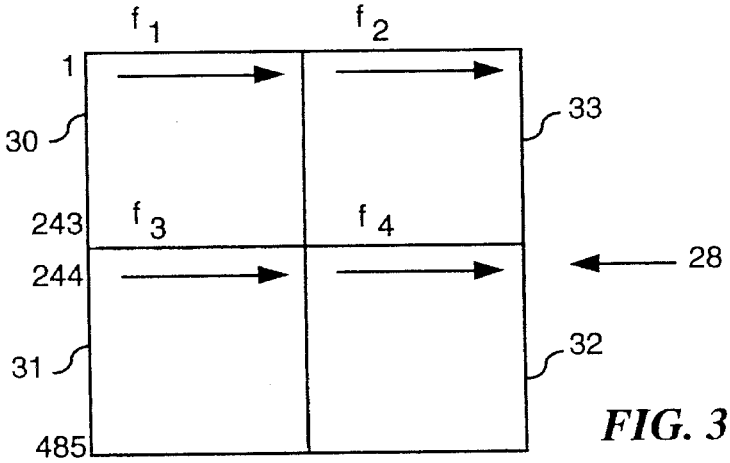
FIG. 3 illustrates a quad video imaging array and a scanning technique according to the present invention.

Referring to FIG. 3, an imaging array system 28 according to the present invention includes a 512 pixel by 485 line (512 by 485) imaging array that is divided into a plurality of pixel imaging array quadrants. As shown in FIG. 3, the 512 by 485 pixel imaging array 28 preferably is divided into four pixel imaging array quadrants 30 and 33 of size 256 by 243 and 31 and 32 of size 256 by 242.

Figure 6:
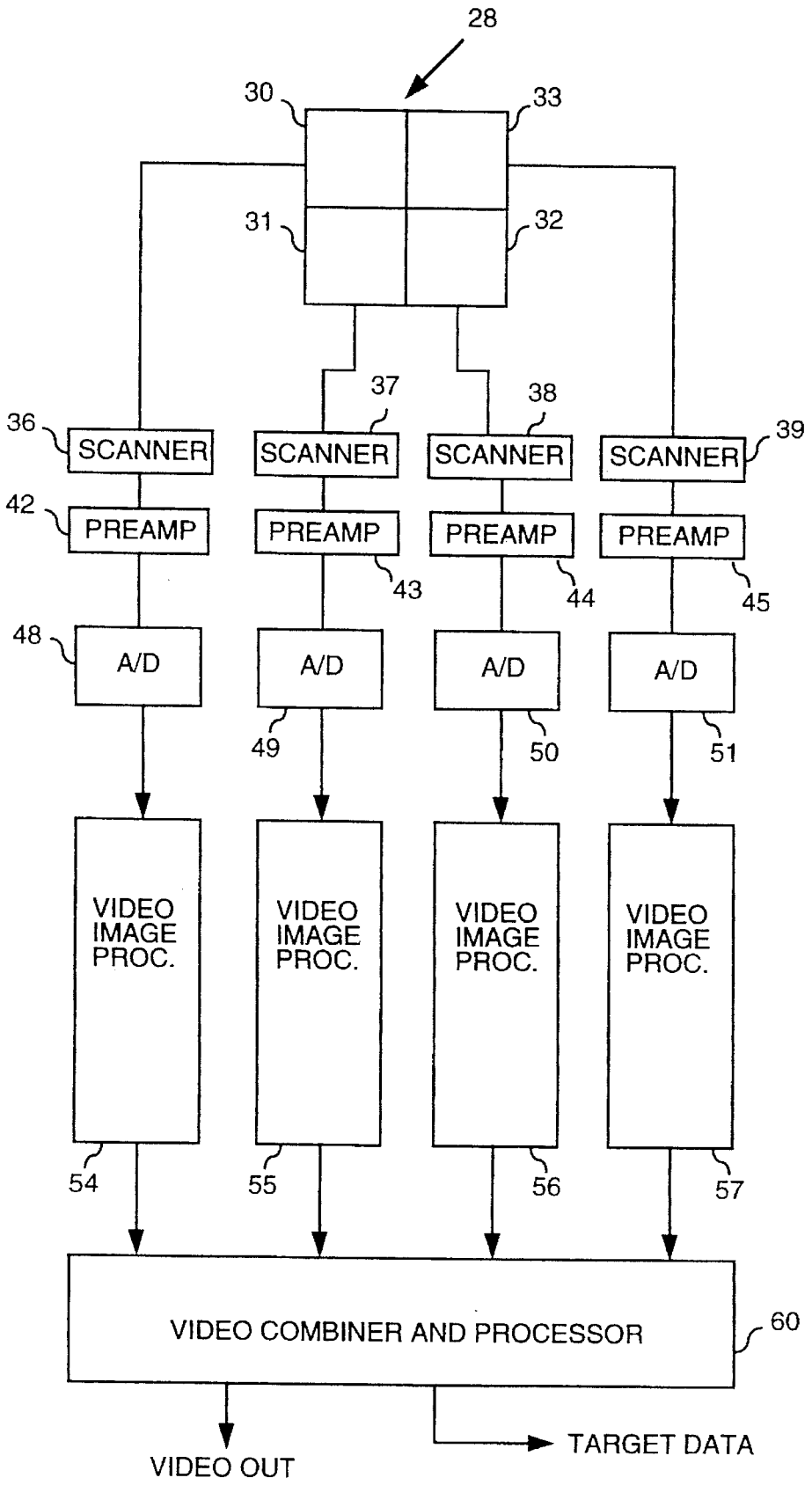
FIG. 6 is a block diagram of a parallel video image processing system according to the present invention.

Referring to FIG. 6, each of the pixel imaging array quadrants 30-33 has its own scanning electronics and preamplifier. The pixel imaging array quadrant 30 outputs a signal to a video scanner 36. The pixel imaging array quadrants 31–33 provide outputs to video scanners 37–39. The signals output from the video scanners 36–39 are input to preamplifiers 42–45, respectively. The amplified video signals are then converted into digital signals by analog-to-digital converters 48–51 that are connected to the preamplifiers 42–45, respectively.

Still referring to FIG. 6, the digital signals output from the analog to digital converters 48–51 are input to video image processors 54–57, respectively. The video image processors 54–57 produce digital video and target data.

The branches of the imaging array system 28 operate in parallel. The scanning electronics and preamplifier for the quadrants 30–33 function synchronously. The result of synchronous operation of the pixel imaging array quadrants and the associated electronic systems is the production of four video signals instead of the single video signal produced in prior art systems.

The video image processors 54–57 provide digital video and target data in parallel to a video combiner and processor 60. The video combiner and processor 60 produces target data and a single video signal output. The single video signal output from the combiner and processor 60 may be either analog or digital. The video and target data may be processed to produce missile guidance data.

Figure 7:
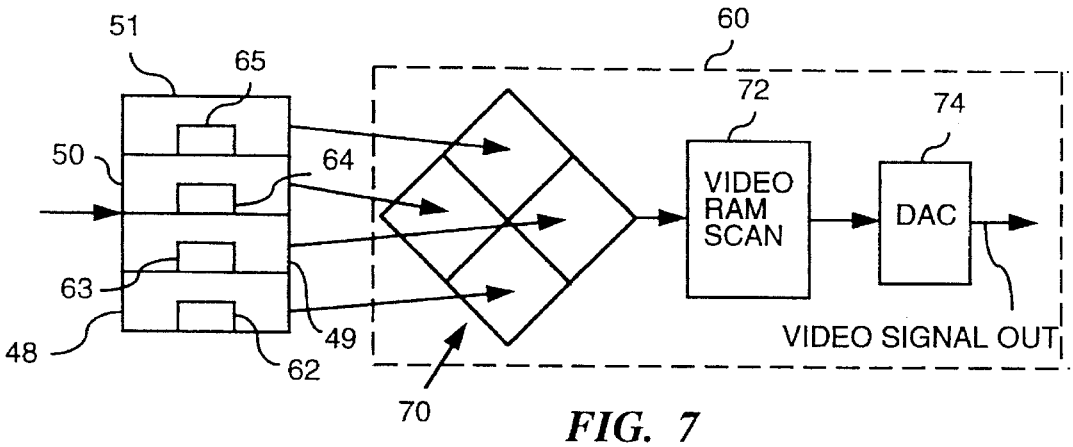
FIG. 7 is a block diagram of video combiner and processor that may be included in the video image processing system according to the present invention.

FIG. 7 illustrates a structure for the video combiner and processor 60 of FIG. 6. The parallel video image processors 48–51 include video random access memory (VRAM) buffers 62–65 that each have about 64K of storage capacity. Each video processor stores its video signal in the corresponding VRAM buffer and processes it. The 64K VRAM buffers 62–65 may be larger or smaller than 64K, depending upon the application, but each of the VRAM buffers 62–65 should have storage capacity sufficient to hold the pixel data for one quadrant.

The signals output from the parallel video image processors 48–51 are input to a VRAM 70 that may have about 256K of storage capacity. The VRAM 70 should have storage capacity adequate to hold a complete video frame. A video RAM scanner 72 scans the VRAM 70 by reading the video image one line at a time. The video RAM scanner 72 outputs the video data to a digital to analog converter (DAC) 74. The DAC 74 converts the digital pixel data into an analog signal suitable for display on a video monitor. The data from the parallel video image processors should be input to the VRAM 70 at even numbered lines while the video RAM scanner reads the data from the VRAM 70 at odd numbered lines. While the parallel video image processors input data into the VRAM 70 at odd numbered lines, the video RAM scanner 72 reads the VRAM at even numbered lines. Reading and inputting into even and odd lines as just described takes advantage of the odd-even interlace pattern inherent in the video signal to allow simultaneous reading and writing of the VRAM. The result is a video signal that is compatible with ordinary conventional video.

FIG. 3 shows how the imaging array 28 may be scanned. The scanning of all four quadrants 30–33 is synchronized. The scanning of all four quadrants 30–33 begins on the left at the same time and ends on the right at the same time. This type of scan is referred to as a quad video scan. It can be seen from FIGS. 1 and 3 that one conventional video scan is equal to two quad video scans. The relationship between conventional scanning and quad video scans may be shown mathematically:

$$f_1+f_2=f_o.$$

The two scan frequencies $f_l$ and $f_2$ are equal, which means that $$2f_1=f_o.$$

Therefore, each quadrant in the quad video sensor scans two horizontal lines in the same time required for one conventional video line scan.

Figure 4:
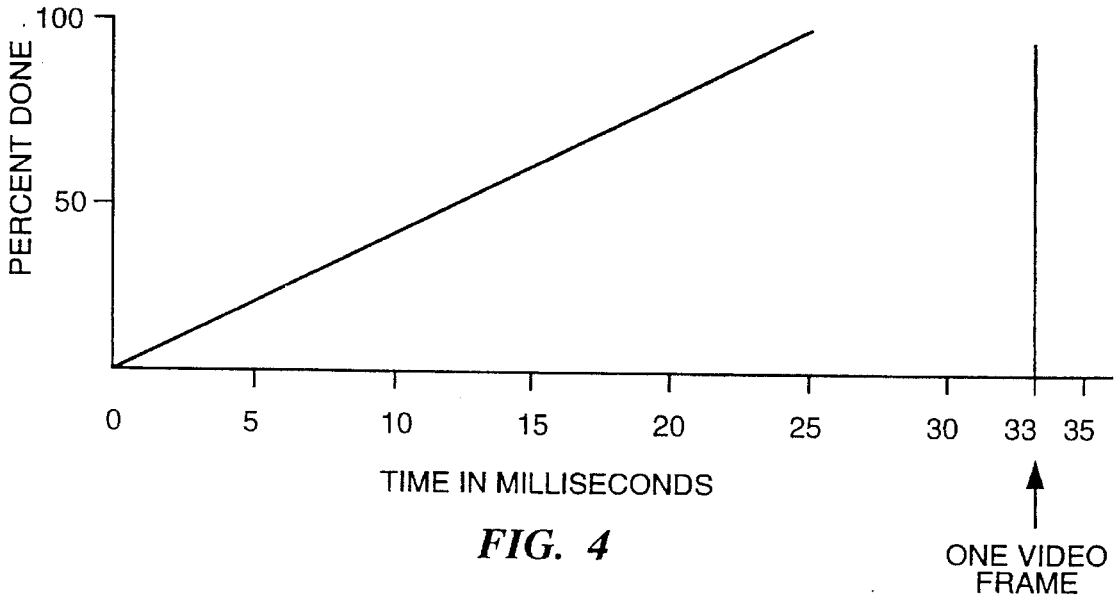
FIG. 4 graphically illustrates the time to read one video frame in a conventional video system.
Figure 5:
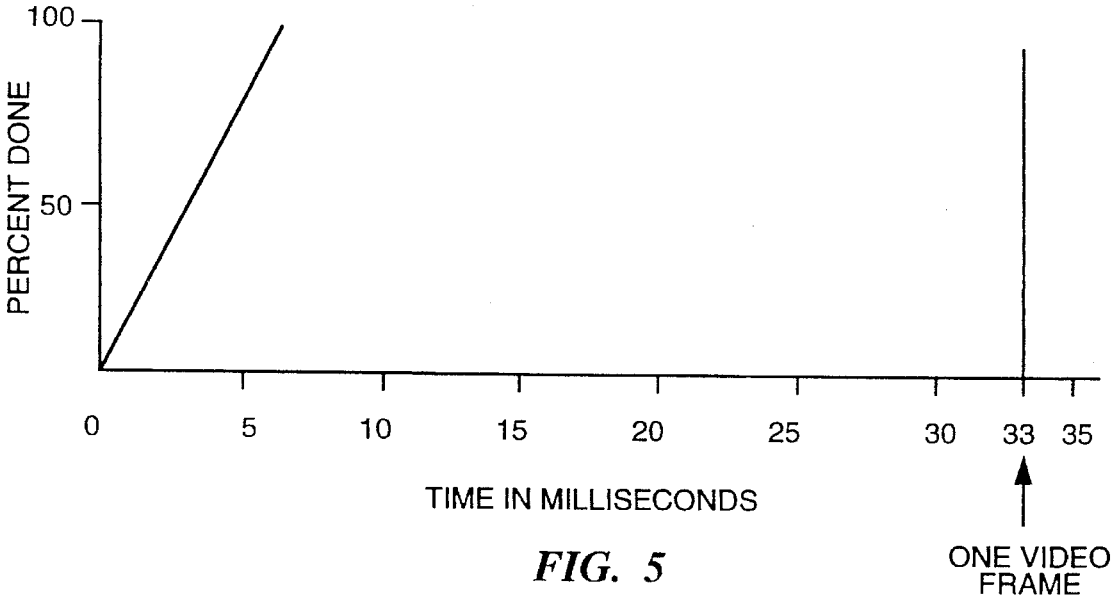
FIG. 5 graphically illustrates the time to read one video frame in a video system according to the present invention.

As shown in FIGS. 4 and 5, the performance of the quad video sensor is superior to that of conventional video. The graphs of FIGS. 4 and 5 are for a system that includes a 64K video buffer in each of the video image processors 54–57. The buffers store the video data for each corresponding quadrant. The video combiner and processor preferably includes at least one 256K video buffer. The video processors should be capable of processing one video line in 50 μs.

The performance parameters of conventional video and the quad video sensors may be compared by calculating their times for the midpoints (50% complete) and end points (100% complete). For conventional video:

$$\text{midpoint} = 243 \text{ lines} \times 50 \frac{\text{ms}}{\text{line}} = 12.2 \text{ ms}$$

$$\text{endpoint} = 485 \text{ lines} \times 50 \frac{\text{ms}}{\text{line}} = 24.3 \text{ ms}$$

For the quad video sensors:

$$\text{midpoint} = 243 \frac{\text{lines}}{\text{quadrant}} \times \frac{1}{2} \text{ quadrant} \times 25 \frac{\text{ms}}{\text{line}} = 3.0 \text{ ms}$$

$$\text{endpoint} = 243 \text{ lines} \times 25 \frac{\text{ms}}{\text{line}} = 6.1 \text{ ms.}$$

FIGS. 4 and 5 and the above calculations show that the quad video sensor saves a substantial amount of processing time. The extra time saved by the quad video sensor may be used to process larger, more sophisticated image processing algorithms than is possible with conventional video. The quad video sensor permits more image processing operations than conventional video even if both systems include processors having the same speed. Having the four processors working together simultaneously thus provides significant advantages over conventional video processing.

The structures and methods disclosed herein illustrate the principles of the present invention. The invention may be embodied in other specific forms without departing from its spirit or essential characteristics. Therefore, the described embodiments are to to be considered in all respects as exemplary and illustrative rather than restrictive. Therefore, the appended claims rather than the foregoing description define the scope of the invention, All modifications to the embodiments described herein that come within the meaning and range of equivalence of the claims are embraced within the scope of the invention.

What is claimed is:

1. A video sensor system for parallel processing optical image signals, comprising:

a plurality of synchronized pixel imaging arrays for simultaneously producing parallel signals indicative of portions of the image of an object;

video image processor means corresponding and connected to each pixel imaging array and operating synchronized and in parallel for simultaneously processing the signals indicative of portions of the image of an object produced by the plurality of pixel arrays to produce a plurality of parallel video image output signals; and means for simultaneously receiving and storing said parallel video output signals from said processor means and combining the plurality of stored parallel video image signals to produce a video signal indicative of the complete image of the object.

2. The video sensor system of claim 1 including a plurality of circuits connected in parallel between the plurality of pixel imaging arrays and the means for receiving and storing said parallel video output signals from said processor means and combining the plurality of video image signals, each circuit comprising:

means for scanning a corresponding one of the pixel arrays to produce analog signals indicative of optical signals incident upon the pixel array; and means connected to said scanning means for converting the analog signals to digital video and target data signals.

3. The video sensor system of claim 2 including four synchronized parallel pixel imaging arrays and four synchronized parallel processing circuits.

4. The video sensor system of claim 1 wherein the means for simultaneously receiving and storing said parallel video output signals from said processor means and combining the plurality of stored parallel video image signals comprises:

a video random access memory having a plurality of sections, each section being connected to a corresponding one of the video image processor means to receive parallel digital video signals therefrom;

video random access scanning means connected to the video random access memory; and means connected to the video random scanning means for producing a video signal output indicative of the complete image of the object.

5. A method for parallel processing optical image signals in a video sensor system, comprising the steps of:

simultaneously producing parallel signals indicative of portions of the image of an object from a plurality of synchronized and parallel pixel imaging arrays;

simultaneously processing the parallel signals produced by the plurality of synchronized pixel imaging arrays to produce a plurality of parallel video image output signals with synchronized video image processor means corresponding to each pixel imaging array and operating in parallel; and simultaneously receiving and storing said parallel video output signals and in a video ram memory and combining the plurality of stored parallel video image output signals to produce a video signal indicative of the complete image of the object.

6. The method of claim 5 wherein the step of producing parallel signals includes the steps of:

simultaneously scanning the synchronized pixel arrays to produce parallel analog signals indicative of portions of the image of an object corresponding to optical signals incident upon the pixel arrays; and simultaneously converting the parallel analog signals to complete digital video image and target data signals.

7. The method of claim 6 wherein the steps of simultaneously producing and parallel processing the signals indicative of portions of the image of an object are performed in each quadrant of said image synchronously and, simultaneously.

8. The method of claim 5 wherein the step of combining the plurality of stored parallel video image signals comprises the steps of:

scanning said video ram memory to read the video image one line at a time; and processing the video random scanning means to produce a video signal output suitable for display.

* * * * *